US012316182B2

(12) United States Patent
Muñiz Casais et al.

(10) Patent No.: US 12,316,182 B2
(45) Date of Patent: May 27, 2025

(54) ELECTRICAL MACHINE TOOTH ASSEMBLIES AND METHODS

(71) Applicant: General Electric Renovables Espana, S.L., Barcelona (ES)

(72) Inventors: Cesar Muñiz Casais, Barcelona (ES); David Alcalde López, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 245 days.

(21) Appl. No.: 17/968,268

(22) Filed: Oct. 18, 2022

(65) Prior Publication Data
US 2023/0131690 A1 Apr. 27, 2023

(30) Foreign Application Priority Data
Oct. 22, 2021 (EP) .................................... 21382957

(51) Int. Cl.
 *H02K 3/487* (2006.01)
 *H02K 7/18* (2006.01)
 *H02K 15/13* (2025.01)
 *F03D 9/25* (2016.01)
(52) U.S. Cl.
 CPC ........... *H02K 3/487* (2013.01); *H02K 7/1838* (2013.01); *H02K 15/13* (2025.01); *F03D 9/25* (2016.05)
(58) Field of Classification Search
 CPC .. H02K 3/487; H02K 7/1838; H02K 15/0018; F03D 9/25
 See application file for complete search history.

(56) References Cited

U.S. PATENT DOCUMENTS

| | | | | |
|---|---|---|---|---|
| 464,027 A * | 12/1891 | Kammeyer | ............ | H02K 3/522 310/194 |
| 1,414,773 A * | 5/1922 | Coseo | ..................... | H02K 3/522 310/194 |
| 3,008,786 A | 11/1961 | Costello | | |
| 4,712,035 A * | 12/1987 | Forbes | ................... | H02K 1/148 310/216.081 |
| 4,812,695 A * | 3/1989 | Parshall | ................. | H02K 3/522 310/410 |

(Continued)

FOREIGN PATENT DOCUMENTS

| | | |
|---|---|---|
| DE | 700420 C | 12/1940 |
| DE | 10244201 A1 | 4/2004 |

(Continued)

OTHER PUBLICATIONS

European Search Report Corresponding to EP21382957.5 on Apr. 11, 2022.

*Primary Examiner* — Terrance L Kenerly
(74) *Attorney, Agent, or Firm* — Dority & Manning, P.A.

(57) ABSTRACT

The present disclosure relates to tooth assemblies (100) comprising a tooth body (110), a winding (120) arranged around the tooth body (110) and a winding stopper (130). The winding stopper (130) comprises a first portion (131) shaped and dimensioned to be received in a groove (114) of the tooth body (110). Further, the winding stopper (130) comprises a second portion (132) extending from the first portion (131) and protruding from a first lateral wall (113) of the tooth body (110). Winding stoppers (130) and methods (800) for assembling a tooth assembly (100) are also provided.

20 Claims, 5 Drawing Sheets

(56) References Cited

U.S. PATENT DOCUMENTS

| | | | |
|---|---|---|---|
| 5,212,419 A | * | 5/1993 | Fisher .................... H02K 21/12 |
| | | | 310/43 |
| 6,331,745 B2 | | 12/2001 | Blakelock et al. |
| 7,990,015 B2 | | 8/2011 | Mongeau et al. |
| 8,358,189 B2 | | 1/2013 | Kaessner et al. |
| 8,618,710 B2 | | 12/2013 | Kimiabeigi |
| 8,686,719 B2 | | 4/2014 | Helle et al. |
| 8,970,333 B2 | | 3/2015 | Mongeau |
| 9,082,546 B2 | | 7/2015 | Komura et al. |
| 10,749,395 B2 | | 8/2020 | Adam et al. |
| 11,081,924 B2 | | 8/2021 | Anghel et al. |
| 2004/0189136 A1 | | 9/2004 | Kolomeitzev |
| 2021/0083533 A1 | | 3/2021 | Azar et al. |

FOREIGN PATENT DOCUMENTS

| | | | | |
|---|---|---|---|---|
| EP | 0871282 | * | 10/1998 | ......... H02K 15/0442 |
| EP | 2887512 A1 | | 6/2015 | |
| EP | 2894769 A1 | | 7/2015 | |
| EP | 3107194 B1 | | 11/2018 | |
| EP | 3557733 A1 | | 10/2019 | |
| EP | 3579387 A1 | | 12/2019 | |
| EP | 3637585 A1 | | 4/2020 | |
| GB | 189460 A | | 9/1923 | |
| GB | 1 389 460 A | | 4/1975 | |
| JP | 2007159256 A | | 6/2007 | |
| JP | WO2019021656 | * | 1/2019 | ............... H02K 1/18 |
| WO | WO2019/025044 A1 | | 2/2019 | |

\* cited by examiner

ELECTRICAL MACHINE TOOTH ASSEMBLIES AND METHODS

FIELD

The present disclosure relates to electrical machine tooth assemblies, to winding stoppers and to methods for assembling an electrical machine tooth assembly. The present disclosure further relates to electrical machines including such assemblies and to wind turbines incorporating generators with such assemblies.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

Wind turbine generators, and other electrical machines such as motors, generally comprise a rotor and a stator. The rotor rotates with respect to the stator. The rotor may be inner structure and the stator the other structure. The stator therefore may radially surround the rotor. Alternatively, in other configurations the arrangement may be opposite, with the rotor radially surrounding the stator.

Large electrical generators, as in modern wind turbines, may be permanent magnet excited generators (PMG) or electrically excited generators.

In permanent magnet generators, permanent magnets (PM) are generally arranged on the rotor, whereas winding elements, i.e., coils, are usually included in the stator. Alternatively, permanent magnets could also be arranged in the stator structure and winding elements in the rotor structure. Permanent magnet generators are generally reliable and require less maintenance than other type of generators.

On the other hand, electrically excited generators generally comprise a rotor having a plurality of pole shoes and excitation windings, i.e., coils. In use, a current is applied to the excitation coils. The applied current creates the polarity of the poles, wherein adjacent poles have a different magnetic polarity. As the rotor turns, the magnetic field from the pole shoes is applied to the windings of the stator causing a variable magnetic flux in the stator windings and producing a voltage in the stator windings. Thus, in electrically excited generators, the magnetic field to generate the electrical power is created electrically, and therefore permanent magnets are not required.

A typical permanent magnet generator comprises a stator comprising a stator yoke with a plurality of teeth protruding in a radial direction. The teeth may protrude towards a center of the stator yoke in generators where the stator surrounds the generator rotor. Alternatively, in generators where the generator rotor surrounds the stator, the teeth may protrude in a radial direction towards the outside of the stator yoke. Further, a plurality of slots may be defined between adjacent teeth, wherein each slot may house a respective winding.

In order to protect and keep the preformed coils in place, a winding stopper (or so-called wedge) may be coupled to the respective generator tooth. It is known e.g. to use winding stoppers (or other winding retention elements) that span the space between adjacent teeth and hold the coils in between these teeth in place. However, the assembly process may be time-consuming, complicated, and cumbersome. Also, the winding stoppers have been found to affect the cooling of the coils in operation.

Consequently, the present disclosure provides methods and systems to at least partially overcome some of the aforementioned drawbacks.

SUMMARY

In an aspect of the present disclosure, a tooth assembly for an electrical machine is provided. The tooth assembly comprises a tooth body extending along a longitudinal direction from a first end wall to a second end wall. The tooth body defines a first and a second lateral walls substantially parallel to the longitudinal direction. Further, the first and second lateral walls comprise a groove extending substantially parallel to the longitudinal direction. The tooth assembly also comprises a winding arranged around the tooth body and a winding stopper. The winding stopper is attached to the first lateral wall of the tooth body. Further, the winding stopper comprises a first portion shaped and dimensioned to be received in the grooves, and a second portion extending from the first portion. The second portion extends from the first portion and protrudes from the first lateral wall of the tooth body, and the winding stopper is only supported by the tooth body at the first lateral wall.

According to this aspect, the fact that each tooth assembly is independent from the others allows to complete tooth assemblies aside of the main stator (or rotor) assembly line, reducing the overall assembly time of the generator. Further, this configuration also simplifies the disassembly process of a tooth to be replaced. Additionally, as the winding stopper is attached to a single tooth and may not extend between teeth, the heat transfer coefficient between the coil and the cooling means is improved. Further, as the winding stopper is only in contact with one of the lateral walls of the tooth body, it can be used with windings comprising connection components extending along the end walls of the tooth body further than the winding itself.

Furthermore, the tooth assembly disclosed is suitable to receive round-wire windings and preformed windings. Preformed coils may comprise windings with rectangular cross-section closely packed, which may lead to a higher slot fill factor and therefore, a higher output torque. Further, compared against round-wire windings, preformed coils may be manufactured such as to enhance thermal conductivity from the center of the yoke slot towards the teeth walls. This may result in a better distribution of the generated heat over the slot and a reduction of the peak temperature inside the slot and winding. Due to their rigid structure, the preformed coils need to be inserted radially into the slots. Therefore, tooth assemblies which can be mounted independently from the others substantially simplify the overall generator assembly process, independently of these being mounted in the stator, as for example in permanent magnet generators, or in the rotor, as for example in electrically excited generators.

In an additional aspect, a method for assembling a tooth assembly is provided. The method comprises providing a tooth body that extends along a longitudinal direction from a first end wall to a second end wall. The tooth body also defines a first and a second lateral wall substantially parallel to the longitudinal direction. Further, the first lateral wall comprises a groove extending substantially parallel to the longitudinal direction. Besides, the method comprises providing a winding around the tooth body. Then, the method comprises providing a winding stopper comprising a first portion and a second portion. The first portion is shaped and dimensioned to be received in the groove of the tooth body, and a second portion extends from the first portion. Additionally, the method comprises coupling the winding stopper with the groove of the tooth body. The coupling is performed so that the second portion of the winding stopper protrudes from the first lateral wall towards the winding, and the winding stopper contacts the tooth body at the first lateral wall only.

According to this additional aspect, this method enables to assemble a tooth assembly independently from other teeth in a simple and yet reliable manner. Further, this method allows to assemble the tooth components such as to leave a clearance gap between winding stoppers of adjacent windings. This clearance gap promotes air circulation and increases the heat transfer coefficient between the winding and the coolant (i.e. air).

In another aspect, a winding stopper configured to be attachable to a tooth assembly including a tooth body is provided. The winding stopper comprises a first portion shaped and dimensioned to mate with a groove of the tooth body. In addition, the first portion comprises a head portion configured to be arranged inside the groove and a neck portion configured to extend from the inside of the groove to an outside. The maximum height of the head portion is greater than a height of the neck portion. Further, the winding stopper comprises a second portion configured to retain a winding arranged around the tooth body.

Additional objects, advantages and features of embodiments of the present disclosure will become apparent to those skilled in the art upon examination of the description, or may be learned by practice of the invention.

DETAILED DESCRIPTION OF EXAMPLES

Reference now will be made in detail to embodiments of the present teaching, one or more examples of which are illustrated in the drawings. Each example is provided by way of explanation of the invention, not as a limitation. In fact, it will be apparent to those skilled in the art that various modifications and variations can be made without departing from the scope or spirit of the present teaching. For instance, features illustrated or described as part of one embodiment can be used with another embodiment to yield a still further embodiment. Thus, it is intended that the present disclosure covers such modifications and variations as come within the scope of the appended claims and their equivalents.

Figure 1:
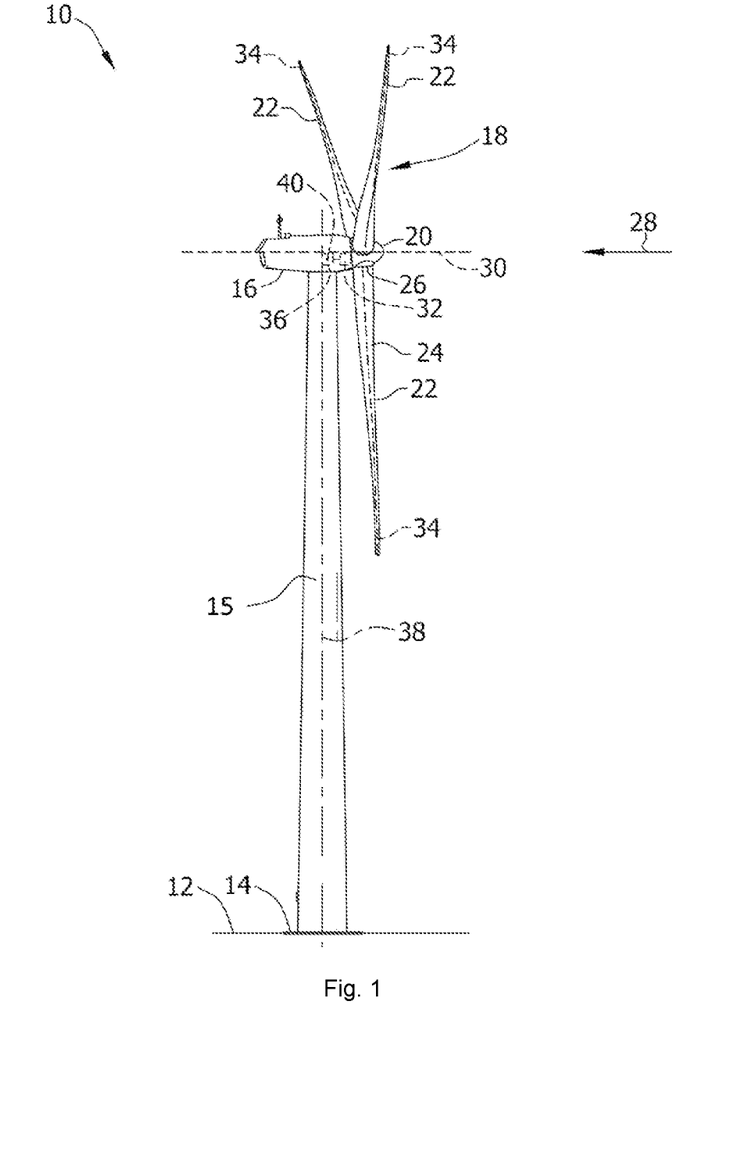
FIG. 1 schematically illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
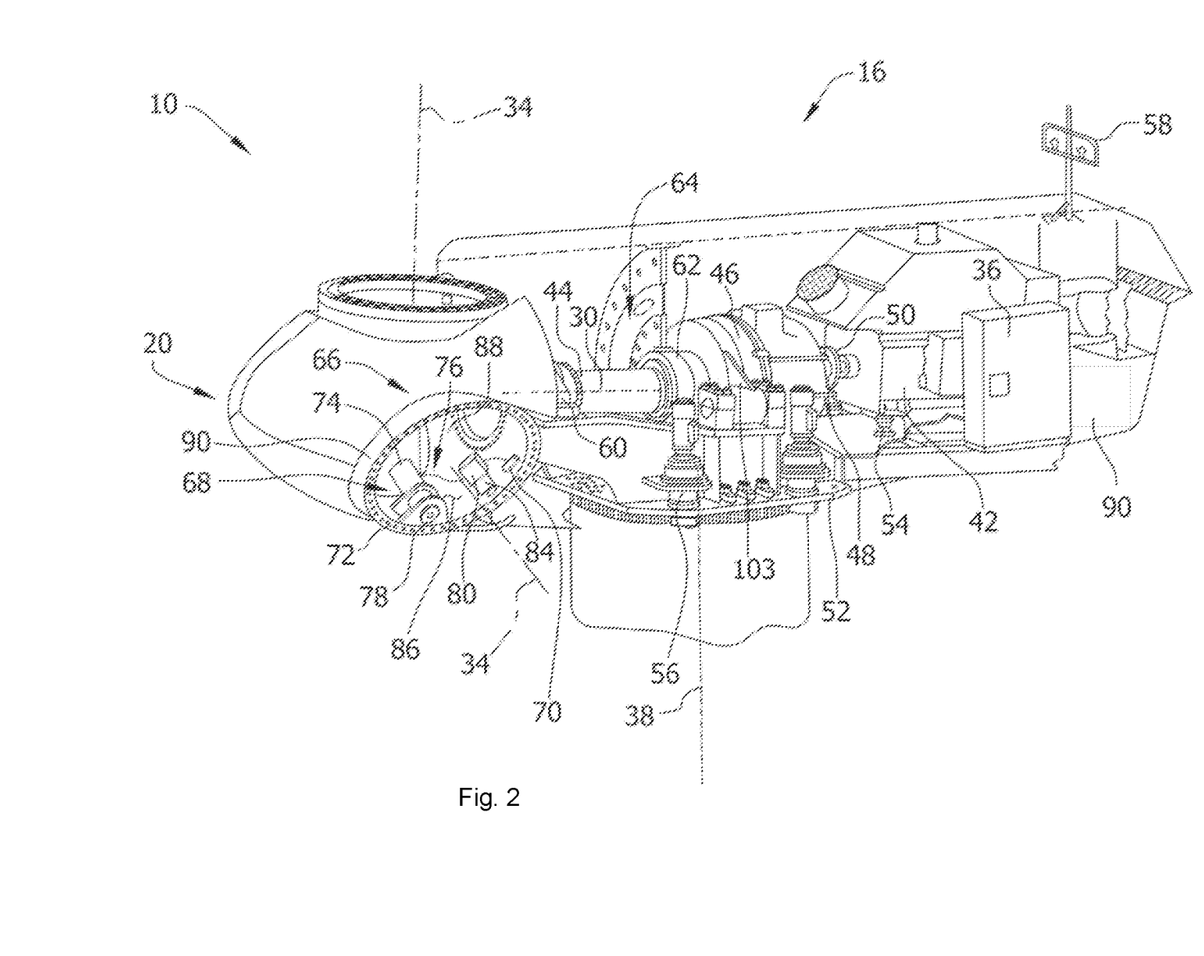
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10.

The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
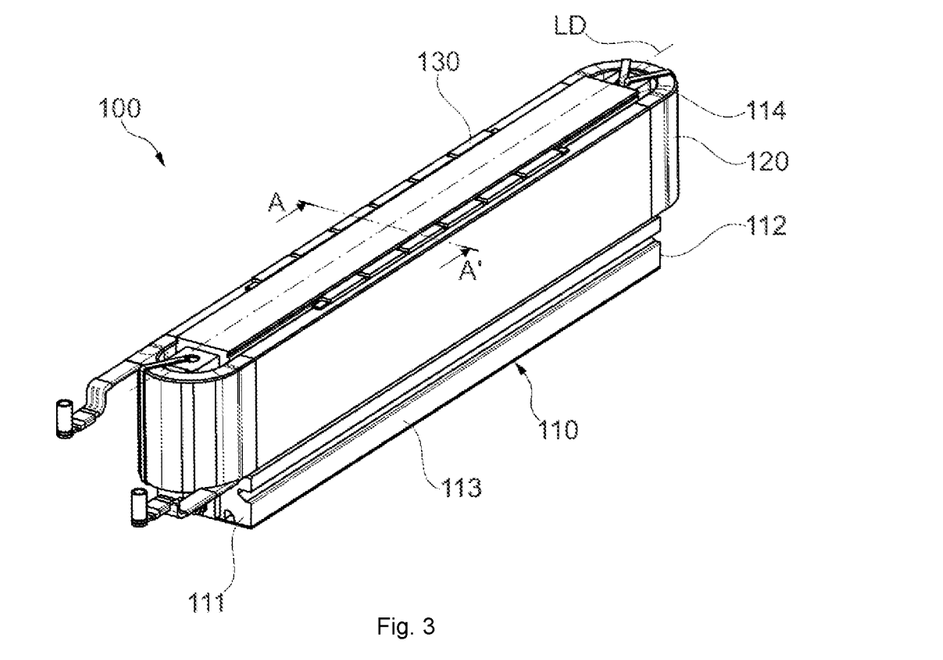
FIG. 3 schematically illustrates a perspective view of one example of a tooth assembly for a generator.

FIG. 3 shows a perspective view of an example of tooth assembly 100 according to the present disclosure. In the illustrated example, the tooth assembly 100 is a stator tooth assembly, but the tooth assembly 100 can also be configured to be mounted on a generator rotor or in other electrical machines. The stator tooth assembly 100 comprises a tooth body 110 extending along a longitudinal direction LD from a first end wall 111 to a second end wall 112. The tooth body 110 also defines a first and a second lateral walls 113 substantially parallel to the longitudinal direction LD, wherein the first and second lateral walls 113 comprise a groove 114 extending substantially parallel to the longitudinal direction LD. The stator tooth assembly 100 further comprises a winding 120 arranged around the tooth body 110 and a winding stopper 130. The winding stopper 130 is attached to the first lateral wall 113 and comprises a first portion shaped and dimensioned to be received in the groove 114. The winding stopper 130 also comprises a second portion 132 extending from the first portion 131 and protruding from the first lateral wall 113. As illustrated, the winding stopper 130 is only supported by the tooth body 110 at the first lateral wall 113.

Further, FIG. 3 shows that a lateral wall 113 of the tooth body 110 may comprise a groove 114 extending into a first end wall 111 of the tooth body 110. This allows introduction of a winding stopper 130 into the groove 114 axially e.g. from a first end wall 111 to later slide it along the groove 114 to the desired location. In this example, the groove 114 extends longitudinally from a first end wall 111 to a second end wall 112 of the tooth body, but other configurations are also possible. In other examples, the tooth body 110 may comprise separated grooves 114, i.e. two grooves 114, one extending axially from a first end wall 111 and another extending axially from a second end wall 112. Additionally, the grooves 114 may also have a relatively large local opening in a lateral wall 113 to allow the introduction of a winding stopper 130 throughout the same.

FIG. 3 also shows that a groove 114 of the tooth body 110 may comprise an inner chamber and a orifice. The orifice, located in a lateral wall 113, gives access to the inner chamber. Additionally, the inner chamber may have a greater cross-section than the orifice. This is further illustrated in FIGS. 5 to 7 and discussed in respect to the same.

Furthermore, FIG. 3 shows that the stator tooth assembly 100 may comprise a plurality of winding stoppers 130 distributed along the grooves 114. The winding stoppers 130 may extend in the longitudinal direction LD of between 50 mm and 150 mm, specifically between 75 mm and 125 mm. The aforementioned range in length of the winding stoppers 130 allows to introduce several winding stoppers 130 longitudinally spaced along the grooves 114, simplifies manufacturing of the winding stopper 130 and reduces material costs as compared with a single winding stopper 130 longitudinally extending along the entire length of the tooth body 110. Alternatively, and depending on specific requirements or sizes of the stator generator, winding stoppers 130 having longer or shorter lengths can also be used. Thus, in other examples, the winding stopper may extend longitudinally between 60% and 90% of a length of the stator tooth 100 along the longitudinal direction, specifically between 70% and 90% of the length of the stator tooth 100.

Figure 4:
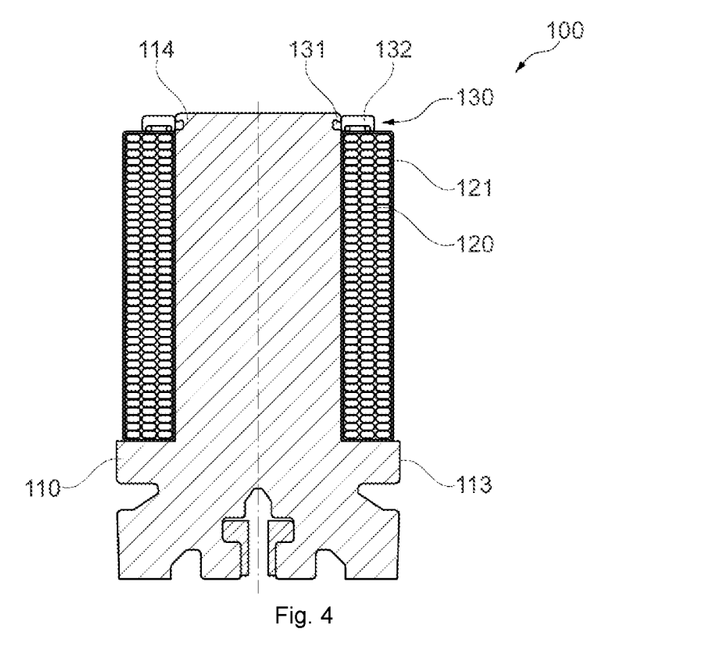
FIG. 4 schematically illustrates a cross-section across the plane A-A' in FIG. 3.

FIG. 4 shows a cross-section view across the plane A-A' illustrated in FIG. 3. The cross-section of the stator tooth assembly 100 shows that the first portion 131 of the winding stopper 130 is substantially inside the groove 114, whereas the second portion 132 of the winding stopper 130 protrudes substantially perpendicular from a lateral wall 113 of the tooth body 110. More precisely, the present example illustrates that the second portion 132 of the winding stopper 130 extends a portion of a winding thickness. The winding stopper 130 may therefore extend at most up to an outer lateral wall 121 of a winding 120. Thus, the winding stopper 130 may not hinder the air flow circulation around the windings 120. This can substantially improve the heat transfer coefficient of the stator tooth assembly 100 and improve the cooling rate of the stator tooth assembly 100 for a given cooling system (not illustrated). The use of a plurality of winding stoppers 130 which are longitudinally distributed along the tooth body make it possible for each of the individual winding stoppers 130 to adapt to some extent to the local height of the winding. The use of one or more winding stoppers 130 which do not extend over the whole length of the tooth body 110 may also improve the heat transfer coefficient and promote a more homogenous cooling than for single winding stoppers extending from one end wall to the other. Although FIGS. 3 and 4 illustrate a tooth assembly 100 configured to be mounted in a generator stator, the same advantages would be present in a tooth assembly for a generator rotor.

Further, the exemplary winding stopper 130 in FIG. 4 comprises a first portion 131 of substantially rectangular shape that mates with the also rectangular cross-section of the inner chamber of the groove 114. However, the shape and dimension of the first portion 131 and the corresponding shape of the inner chamber of the grooves 114 may vary depending on stator tooth requirements and on suitability of manufacturing techniques. In some examples, the inner chamber may have a cross-section geometry of substantially circular shape, L-shape, T-shape or dovetail shape. Different shapes and dimensions of the aforementioned components are also possible, and are further discussed in respect to FIGS. 5 to 7.

Additionally, the winding stopper 130 may be made of composite material. Thus, a winding stopper 130 may comprise fibres made of glass, carbon, aramid, basalt or others; and resins such as epoxy, polyester or others. The winding stoppers 130 may be pultruded profiles cut to length. Alternatively, the winding stoppers 130 can also be manufactured from a blank metal piece using known machining techniques.

Figure 5:
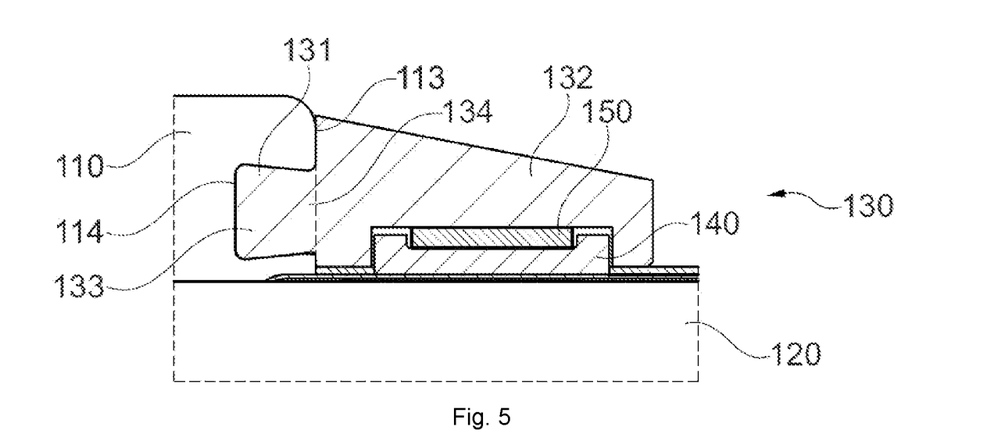
FIG. 5 schematically illustrates a detailed view of an example of a winding stopper assembly in a generator tooth.
Figure 6:
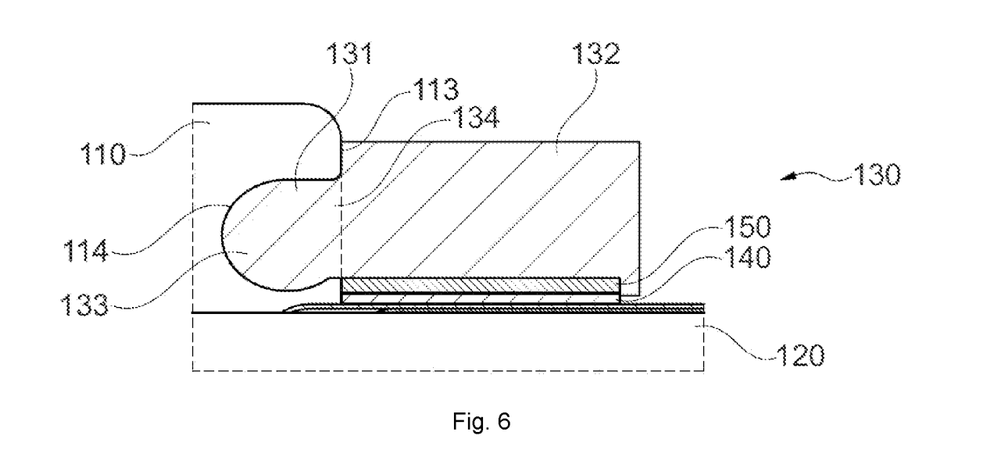
FIG. 6 schematically illustrates a detailed view of another example of a winding stopper assembly in a generator tooth.
Figure 7:
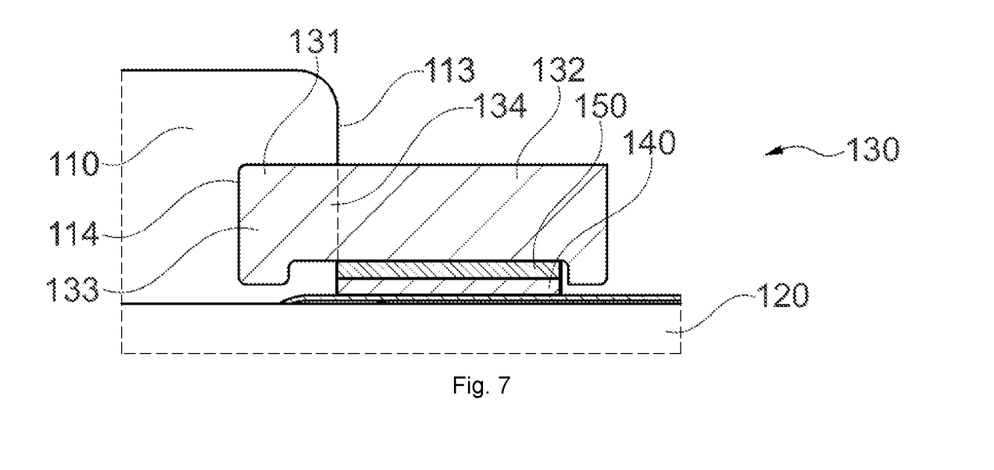
FIG. 7 schematically illustrates a detailed view of yet another example of a winding stopper assembly in a generator tooth.

FIGS. 5 to 7 schematically illustrate detailed views of different examples of winding stoppers 130 in a tooth body 110. The tooth body 110 may be a generator stator tooth body or a generator rotor tooth body. Thus, the present disclosure also provides a winding stopper 130. The winding stopper 130 is configured to be attachable to a tooth assembly 100 including a tooth body 110. Further, the winding stopper comprises a first portion 131 and a second portion 132. The first portion 131 is shaped and dimensioned to be received in in a groove 114 of the tooth body 110. More specifically, the first portion 131 may be shaped and dimensioned to substantially mate with a groove 114 of the tooth body 110. The first portion comprises a head portion 133 configured to be arranged inside the groove 114 and a neck portion 134 configured to extend from the inside of the groove 114 to an outside. As illustrated in FIGS. 5 to 7, the maximum height of the head portion 133 is greater than the height of the neck portion 134. The second portion is configured to retain a winding arranged around the tooth body. The geometry of the first portion 131 increases the reliability of the wind stopper attachment. Since the head portion 133 can only be removed from the groove 114 along the longitudinal (axial) direction (i.e. not in a lateral or circumferential direction), a winding stopper with cantilever configuration can secure the winding in place. Additionally, the winding stopper may be configured to contact a lateral wall 113 of the stator tooth body 110.

Further, the winding stopper 130 may comprise a protective element 140 and a biasing element 150. Additionally, the protective element 140 is configured to be coupled to the stator winding 120, whereas the biasing element 150 is configured to be inserted between the second portion 132 of the winding stopper 130 and the protective element 140. Thus, the biasing element 150 promotes contact between the winding stopper 130 and the stator tooth assembly 100.

The biasing element 150 has been illustrated schematically in FIGS. 5 to 7, but it is noted that the biasing element 150 may be an elastic element such as a ripple spring or a rigid element such as a wedge. Other elastic and rigid elements can also be used as biasing element 150.

The protective element 140 may be made of composite material, as described above in respect to the winding stopper. Further, the protective element 140 may be coupled to the winding 120 by means of gluing. Alternatively, the protective element 140 may be coupled to the winding 120 during a winding manufacturing process, i.e. during resin casting when preformed windings are used.

As discussed, FIGS. 5 to 7 show that the first portion 131 of the winding stopper 130 may be shaped differently. FIG. 5 illustrates a substantially trapezoidal first portion 131, FIG. 6 illustrates a substantially circular first portion 131 and FIG. 7 illustrates a first portion 131 with an inverted L shape. In the illustrated examples, the height the inner chamber in cross-section is greater than the height of the orifice (denoted with a broken line), but other relative dimensions can also be used.

Further, as illustrated in FIGS. 5 to 7, the winding stopper 130 may further comprise a biasing element 150 at least partially located between the winding 120 and the winding stopper 130. Additionally, the winding stopper 130 may further comprise a protective element 140 at least partially located between the biasing element 150 and the winding 120. As illustrated in the figures, the geometry of the contact regions between these components, i.e. winding 120, protective element 140, biasing element 150 and winding stopper 130 may differ. In an example, the protective element 140 may comprise a first layer of felt configured to be in contact with the winding 120 and a second composite layer configured to be in contact with the biasing element 150.

Thus, each of the winding stoppers 130 that can be inserted in a stator tooth assembly 100 may comprise a biasing element 150 with different dimensions and structural properties. This may also contribute to compensate potential differences in height along the winding 120 due to manufacturing imperfections or design considerations, achieving a more homogeneous pressure distribution, and therefore coupling, between the winding 120 and the tooth body 110.

The technical features discussed herein with respect to the winding stopper 130 can be included in a tooth assembly, such as the stator tooth assembly 100 disclosed, or in a rotor tooth assembly. Similarly, the technical features discussed with respect to the stator tooth assembly 100 may be included in the winding stopper 130, when these relate to winding stoppers.

Figure 8:
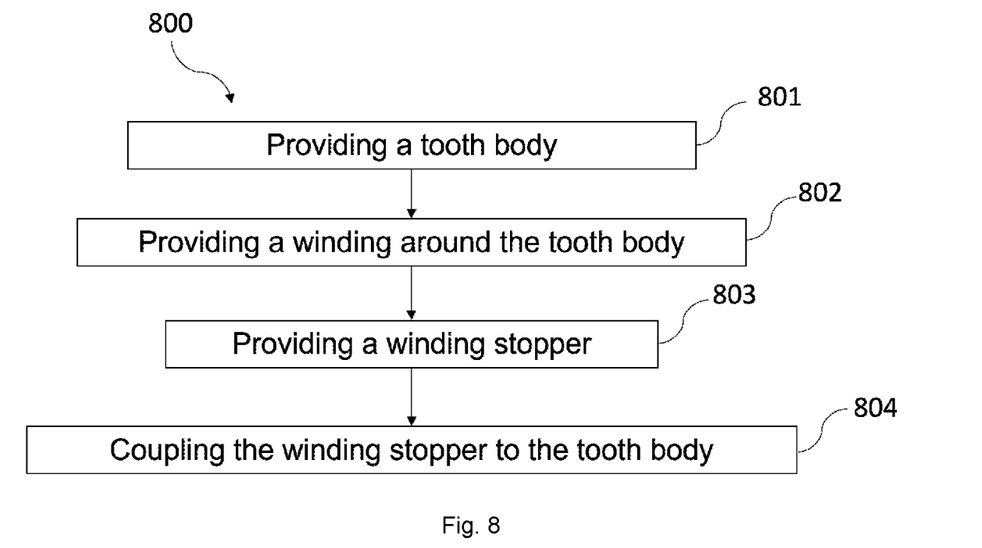
FIG. 8 illustrates a flowchart of an example of a method for providing a tooth assembly for a generator.

In another aspect of the disclosure, a method 800 is provided. Method 800 is suitable for assembling a tooth assembly 100. Method 800 is schematically illustrated in FIG. 8.

The method 800 comprises, at block 801, providing a tooth body 110. The tooth body 110 extends along a longitudinal direction LD from a first end wall 111 to a second end wall 112. Further, the tooth body 110 defines a first and a second lateral wall 113 substantially parallel to the longitudinal direction LD. Besides, the first and the second lateral walls 113 comprise a groove 114 extending substantially parallel to the longitudinal direction LD. The method 800 also comprises, at block 802, providing a winding 120 around the tooth body 110. Further, the method 800 comprises, at block 803, providing a winding stopper 130. The winding stopper 130 comprises a first portion 131 shaped and dimensioned to be received in the groove 114 of the tooth body 110, and a second portion 132 extending from the first portion 131. Additionally, the method 800, at block 804 comprises coupling the winding stopper 130 with the groove 114 of the tooth body 110 so that the second portion 132 substantially protrudes from the first lateral wall towards the winding 120, and the winding stopper contacts the tooth body at the first lateral wall only. Further, first portion 131 of the winding stopper 130 may be shaped and dimensioned, not only to be received in the groove, but also to substantially mate with and inside of the groove 114 of the tooth body 110.

According to this aspect, the method allows to assemble a tooth assembly separate from the main generator assembly line. This reduces the overall assembly time by promoting task parallelization. Further, it also avoids the need of assembling individual tooth components (i.e. windings or winding stoppers) inside the generator. This may also improve the efficiency of the assembly process due to a substantial improve on space limitations. Further, this method allows to assemble a tooth assembly with winding stoppers that may only contact a lateral wall of the tooth body, enhancing the versatility of the assembly and improving the heat transfer coefficient between the winding and the coolant.

In examples of the method 800 disclosed, the groove 114 of the tooth body 110 may extend into at least the first end wall 111. Further, the groove 114 may also comprise an inner chamber and an orifice giving access to the inner chamber. The inner chamber may have a maximum height in cross-section that is greater than a height of the orifice. Thus, the coupling step in block 804 may be performed by inserting the first portion 131 of the winding stopper 130 into the groove 114 of the tooth body 110 along the longitudinal direction. In other examples, the winding stopper 130 may be inserted into the groove 114 through the first end wall 111 and along the longitudinal direction. The fact that the orifice may have a smaller height that the inner chamber implies that the first portion 131 of the winding stopper 130 (with a geometry mating the inner chamber of the groove 114) may not be able to enter or exit the groove 114 through the orifice in the lateral wall 113. This provides a more reliable connection between the winding stopper 130 and the tooth body 110, and provides a secured stop for a potential radial displacement of the winding 120.

In further examples, the method may comprise coupling the tooth assembly to a stator yoke so that the tooth body extends radially relative to the stator yoke. Additionally, the method may also comprise coupling an additional tooth assembly to the stator yoke, in which the tooth assemblies are independently assembled to the stator yoke.

This written description uses examples to disclose the teaching, including the preferred embodiments, and also to enable any person skilled in the art to practice the herein disclosed teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A tooth assembly for an electrical machine comprising:
    tooth body extending along a longitudinal direction from a first end wall to a second end wall and defining first and second lateral walls substantially parallel to the longitudinal direction;
    a groove defined in the first and second lateral walls, the groove extending substantially parallel to the longitudinal direction;
    a winding arranged around the tooth body;
    a winding stopper attached to the first lateral wall, the winding stopper comprising a first portion shaped and dimensioned to be received in the groove, and a second portion extending from the first portion and protruding from the first lateral wall; and
    wherein the winding stopper is supported solely by the tooth body at the first lateral wall and only contacts the tooth body at the first lateral wall without contacting the second lateral wall.

2. The tooth assembly according to claim 1, wherein the groove extends into a first end wall of the tooth body.

3. The tooth assembly according to claim 1, wherein the groove extends longitudinally from a first end wall to a second end wall of the tooth body.

4. The tooth assembly according to claim 1, wherein the winding stopper further comprises a biasing element at least partially located between the winding and the second portion of the winding stopper.

5. The tooth assembly according to claim 4, wherein the biasing element comprises a wedge or a ripple spring.

6. The tooth assembly according to claim 4, wherein the winding stopper further comprises a protective element at least partially located between the biasing element and the winding.

7. The tooth assembly according to claim 6, wherein the protective element comprises a first layer of felt in contact with the winding and a second composite layer configured in contact with the biasing element.

8. The tooth assembly according to claim 1, wherein the groove comprises an inner chamber and an orifice, wherein the orifice gives access to the inner chamber, and the inner chamber comprises a maximum height in cross-section that is greater than a height of the orifice.

9. The tooth assembly according to claim 8, wherein the inner chamber has a cross-section geometry of substantially circular shape, L-shape, T-shape, or dovetail shape.

10. The tooth assembly according to claim 1, wherein the tooth body is configured to be coupled to an electrical generator stator.

11. The tooth assembly according to claim 1, wherein the winding stopper has a length in the longitudinal direction of between 50 mm and 150 mm, and the second portion of the winding stopper extends at most up to an outer lateral wall of the winding.

12. The tooth assembly according to claim 1, wherein the winding stopper extends longitudinally between 60% and 90% of a length of the tooth body along the longitudinal direction.

13. The tooth assembly according to claim 1, wherein the first portion and the second portion of the winding stopper are made of a composite material.

14. A winding stopper configured for attaching to a tooth assembly including a tooth body, wherein the winding stopper is supported solely by the tooth body at a first lateral wall and only contacts the tooth body at the first lateral wall without contacting a second lateral wall, the winding stopper comprising;
    a first portion and a second portion;
    the first portion shaped and dimensioned to mate with a groove of the tooth body, and comprising a head portion configured to be arranged inside the groove and a neck portion configured to extend from the inside of the groove to an outside;
    a maximum height of the head portion being greater than a height of the neck portion; and
    the second portion configured to retain a winding arranged around the tooth body.

15. The winding stopper according to claim 14, further comprising:
    a protective element;
    a biasing element; and
    wherein the protective element is configured to be coupled to a winding, and the biasing element is configured to be inserted between the second portion of the winding stopper and the protective element to promote contact with the tooth assembly.

16. The winding stopper according to claim 15, wherein the biasing element comprises a ripple spring or a wedge.

17. A method for assembling a tooth assembly, the method comprising:
    providing a tooth body extending along a longitudinal direction from a first end wall to a second end wall, and defining a first and a second lateral wall substantially parallel to the longitudinal direction, wherein the first lateral wall comprises a groove extending substantially parallel to the longitudinal direction;
    providing a winding around the tooth body;
    providing a winding stopper comprising a first portion shaped and dimensioned to be received in the groove of the tooth body, and a second portion extending from the first portion; and
    coupling the winding stopper with the groove of the tooth body so that the second portion protrudes from the first lateral wall towards the winding, and the winding stopper contacts the tooth body at the first lateral wall only without contacting the second lateral wall.

18. The method according to claim 17, wherein the groove of the tooth body extends into at least the first end wall and comprises an inner chamber and an orifice giving access to the inner chamber, the inner chamber having a maximum height in cross-section that is greater than a height of the orifice, and wherein coupling the winding stopper to the tooth body comprises inserting the first portion of the winding stopper into the groove of the tooth body along the longitudinal direction.

19. The method according to claim 17, wherein the method further comprises coupling the tooth assembly to a stator yoke so that the tooth body extends radially relative to the stator yoke.

20. The method according to claim 19, wherein the method further comprises coupling an additional tooth assembly to the stator yoke, the tooth assemblies being independently assembled from the stator yoke.

* * * * *